United States Patent
Morley et al.

(10) Patent No.: US 9,261,345 B2
(45) Date of Patent: Feb. 16, 2016

(54) PROBE

(71) Applicant: Elcometer Limited, Manchester (GB)

(72) Inventors: Colin John Morley, Manchester (GB); John Michael Whitaker, Manchester (GB); Michael Carrington Sellars, Manchester (GB)

(73) Assignee: Elcometer Limited, Manchester (GB)

( * ) Notice: Subject to any disclaimer, the term of this patent is extended or adjusted under 35 U.S.C. 154(b) by 188 days.

(21) Appl. No.: 13/972,740

(22) Filed: Aug. 21, 2013

(65) Prior Publication Data

US 2014/0053422 A1    Feb. 27, 2014

(30) Foreign Application Priority Data

Aug. 21, 2012 (GB) .................................... 1214866.4

(51) Int. Cl.
*G01B 5/20* (2006.01)
*G01B 5/28* (2006.01)
*G01B 7/34* (2006.01)

(52) U.S. Cl.
CPC .. *G01B 5/20* (2013.01); *G01B 5/28* (2013.01); *G01B 7/34* (2013.01)

(58) Field of Classification Search
CPC .... G01B 7/012; G01B 2210/58; G01B 5/008; G01B 5/012; G01B 7/28; G01B 17/02; G01B 21/047; G01B 7/003; G01B 7/008; G01B 17/06; G01B 21/04; G01B 5/0002
USPC ............ 33/555.1, 555.2, 555.3, 544.4, 544.5, 33/544.6, 542, 543, 544, 546
See application file for complete search history.

(56) References Cited

U.S. PATENT DOCUMENTS

| | | | | |
|---|---|---|---|---|
| 1,345,071 A * | 6/1920 | Butler | .......................... | 33/555.3 |
| 2,571,917 A * | 10/1951 | Mennesson | ..................... | 33/556 |
| 2,603,043 A * | 7/1952 | Bontemps | ....................... | 451/25 |
| 2,671,272 A * | 3/1954 | Bishop | .......................... | 33/501.2 |
| 2,686,975 A * | 8/1954 | Geipel | .......................... | 33/555.3 |
| 3,305,932 A * | 2/1967 | Iselin | .......................... | 33/555.1 |
| 4,651,430 A * | 3/1987 | Vasku | .......................... | 33/501.2 |
| 4,711,037 A * | 12/1987 | Saadat | ..................... | G01B 5/02 33/520 |
| 5,088,207 A * | 2/1992 | Betsill et al. | ................. | 33/555.3 |
| 5,150,545 A * | 9/1992 | Esteve | .............................. | 451/8 |
| 5,337,485 A   | 8/1994 | Chien | | |
| 5,351,410 A * | 10/1994 | Hainneville | ................... | 33/542 |
| 5,551,906 A * | 9/1996 | Helgren | ........................... | 451/8 |
| 6,044,571 A * | 4/2000 | Strait | .......................... | 33/555.1 |
| 6,430,832 B1* | 8/2002 | Dall'Aglio | ............... | B24B 5/42 33/555.1 |
| 7,159,477 B2* | 1/2007 | Edwin | .................... | G01B 7/281 33/501.08 |

(Continued)

FOREIGN PATENT DOCUMENTS

| | | | |
|---|---|---|---|
| GB | 2186370 A | 8/1987 | |
| JP | 6-294601 A | 10/1994 | |

(Continued)

*Primary Examiner* — Yaritza Guadalupe-McCall
(74) *Attorney, Agent, or Firm* — Leydig, Voit & Mayer, Ltd

(57) ABSTRACT

A surface profile measurement probe comprising two spaced apart points 20 for contacting a convex surface to be measured and a straight edge or surface 22 moveable relative to the two points to enable the straight edge to be brought into contact with a convex surface contacted by the two points. A tip 10 protrudes from and is moveably mounted relative to the straight edge or surface for measuring the profile of a surface contacted by the straight edge.

19 Claims, 3 Drawing Sheets

(56) References Cited

U.S. PATENT DOCUMENTS

| | | | |
|---|---|---|---|
| 7,197,837 B1* | 4/2007 | Blanford et al. | 33/555.1 |
| 7,497,027 B2* | 3/2009 | Waltz, Jr. | 33/555.3 |
| 8,819,953 B2* | 9/2014 | Andersson et al. | 33/555.1 |
| 2002/0178599 A1* | 12/2002 | Smola | 33/555.1 |
| 2009/0031574 A1* | 2/2009 | Waltz, Jr. | 33/555.3 |
| 2012/0246956 A1* | 10/2012 | Andersson et al. | 33/555.1 |
| 2014/0053422 A1* | 2/2014 | Morley | G01B 5/20 33/501 |

FOREIGN PATENT DOCUMENTS

| | | |
|---|---|---|
| JP | 2000-321006 A | 11/2000 |
| JP | 2007-010334 A | 1/2007 |

* cited by examiner

PROBE

CROSS REFERENCE TO RELATED APPLICATIONS

This application claims the benefit of United Kingdom Patent Application No. 1214866.4, filed on Aug. 21, 2012, in the United Kingdom Intellectual Property Office, the entire disclosure of which is incorporated herein by reference.

TECHNICAL FIELD OF THE INVENTION

The present invention relates to a surface profile measuring probe.

BACKGROUND TO THE INVENTION

One conventional instrument for measuring the profile of a surface, to determine surface roughness, comprises a flat annular plate of a particular known size. A resiliently mounted pointed tip protrudes through the central aperture in the plate, and the instrument displays or records the distance which the tip extends beyond the plate.

In use the instrument is placed on a surface to be measured so that it is supported on the plate. The plate will rest on peaks in the surface. The tip is dimensioned so that it can rest in valleys in the surface. Depending on placement of the instrument on a surface the tip will sometimes extend into a valley on the surface, sometimes rest on a peak and sometimes rest at some intermediate position. Multiple measurements are taken placing the instrument in a different position on the surface for each measurement. The range of measurements taken will give an indication of the average profile of the surface over an area.

This type of instrument is intended for measuring the profile of a substantially flat surface. It is not suitable for measuring the profile of a curved surface, because it will not stably rest on such a surface and so accurate measurements cannot be made.

It is an object of embodiments of the present invention to address this problem.

SUMMARY OF THE INVENTION

According to the present invention there is provided a surface profile measurement probe comprising two spaced apart points for contacting a convex surface to be measured, at least a straight edge moveable relative to the two points to enable the straight edge to be brought into contact with a convex surface contacted by the two points and a tip protruding from and moveably mounted relative to the straight edge for measuring the profile of a surface contacted by the straight edge.

The two points and straight edge provide three points of contact, enabling a probe to be supported stably on a convex surface which curves in one direction, so that the tip extends perpendicularly to the surface to be measured, so that an accurate profile measurement can be made of the curved surface.

The straight edge may be arranged to be brought into contact with a surface to be measured between the two points, for example, but not necessarily, mid way between the two points. The tip may protrude from the straight edge substantially at right angles to the straight edge.

The straight edge may be comprised in a substantially flat surface and may be substantially annular in shape. The tip may protrude from substantially the centre of the annulus.

The straight edge may lie in a plane substantially parallel to a straight line extending through the two points. The straight edge may extend in a direction which is substantially perpendicular to a straight line extending through the two points.

The straight edge may be moveable relative to the two points in a direction substantially at right angles to a straight line extending through the two points. The straight edge may be constrained to move in that direction. The straight edge may be movable from a position at which it is displaced from a straight line extending through the two points to, at least, a position where it contacts that line and the straight edge may be resiliently biased to the displaced position relative to the points.

The points may be formed by feet. The feet may project from the body of the probe. The feet may terminate in points. The feet or their tips may be formed by ball bearings. The straight edge may be formed on a probe body, and the points provided on a structure at opposite sides respectively of the body. This structure may be a collar surrounding the probe body.

The probe may comprise a sensor arranged to measure displacement between the tip and the straight edge. The tip may be resiliently biased so that its free end is urged away from the straight edge. The tip may be moveable so that its free end can be moved to lie on the straight edge.

The invention also provides a method of measuring the surface profile of a convex surface comprising the steps of providing a probe according to the invention, placing the points of the probe into contact with the surface to be measured, bringing the straight edge into contact with the surface to be measured and measuring the displacement between the straight edge and the tip.

DETAILED DESCRIPTION OF THE INVENTION

In order that the invention may be more clearly understood an embodiment thereof will now be described, by way of example only, with reference to the accompanying drawings, of which:

Figure 1:
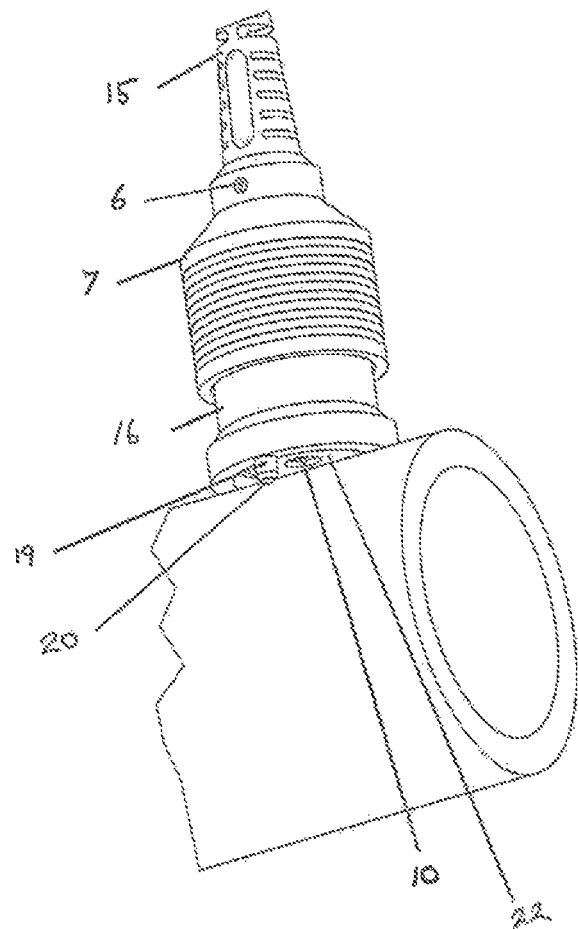
FIG. 1 is a perspective view of a probe in use, placed on a pipe.

In the following the terms, top, bottom, up, down and like terms are used to refer to the probe in the orientation in which it is illustrated, and should not be taken as otherwise limiting.

The drawings show a profile measuring probe intended, in use, to be connected to an electronic measuring instrument, or a suitably programmed computer.

Referring to the drawings the probe comprises a main probe body 1. The main probe body is substantially cylindrical defining a central bore. The lower face of the body 22, facing out from the probe, is substantially flat and substantially annular in shape. In this example the surface area of the lower face is 491 mm$^2$, but of course other surface areas are possible. At the opposite end of the body its external diameter reduces significantly in a step forming a relatively thin walled elongate tube 2 extending from the body and continuing to define the bore. The tube 2 extends into a tubular member 3, relative to which it is secured by grub screws 4. The tubular member 3 is, in turn, received into an external tubular member 5 which is secured to the tubular member 3 by grub screws 6. The external tubular member defines a substantially cylindrical collar 7 which extends over the elongate tube 2 and about half the length of the main probe body 1.

The bore defined by the main probe body 1 and the elongate tube 2 houses a rod 8 with a close sliding fit. To the lower end of the rod 8 a fitting 9 is connected to the rod with a screw fit. The fitting supports a sharp tip 10 which faces out through the bore in the main probe body 1. The tip in this example is formed from tungsten carbide, and has a point with an included angle of substantially 60 degrees. Other embodiments are possible with other included angles, such as 30 degrees.

Part way along the rod 8 a slot 11 is formed in the outside wall of the rod. A body 12 projects from a radial bore in the main probe body 1 into the bore and is received into the slot 11. The body 12 is secured into the radial bore by a grub screw 13. The body interacts with the slot to limit sliding movement of the rod 8 and thus the tip 10 relative to the bore.

At the opposite, upper, end of the rod 8 to the tip 10 the diameter of the rod reduces significantly in a single step. This thin region 14 of the rod extends into a tube 25 formed from a permeable, magnetic material and it moves with the rod. The tube is surrounded by an electromagnetic sensor winding assembly comprising a drive coil and two pickup coils. By providing an electrical signal to the drive coil and measuring a signal generated in the pick up coils it is possible to determine the position of the magnetic tube relative to the coils, and hence the position of the tip 10 relative to the main sensor body.

An electrical connection to the various coils is provided via an electrical cable which extends out of the probe via a plastics material moulding 15.

A further rod 26 is slidably fitted into the bore defined by the tubular member 2 above the magnetic tube and a helical spring 17, which is disposed between the rod 26 and a closed upper end of the tube. The spring 17, via the rod 26, urges the rod 8, and thus tip 10, out of the base of the main probe body 1, to the extent permitted by the body 12.

The arrangement of the main sensor body 1, tip 10 and electromagnetic sensor is largely common to conventional probes and so its operation is not described in further detail. Various different types of sensors could be used to detect the position of the tip 10 relative to the face 22 of the main probe body 1, these include a potentiometer, variable capacitor and variable transformer such as a linear displacement transformer.

The main probe body 1 is fitted into a substantially cylindrical bore defined by a second, internal collar 16. The internal collar 16 extends over the height of the larger diameter part of the main probe body 1, and so just beyond the edge of, and into, the outer sleeve 7. Towards its open end, the internal diameter of the internal collar increases with a single step, for form a radially inwardly projecting shoulder. Around the same point the outside diameter of the internal collar increases. Two feet 19 are fitted into respectively diametrically opposed positions on the end surface of the internal collar 16. A ball bearing 20 is fitted into the free end of each foot.

A cir-clip 21 is fitted round the main probe body 1, towards its free end. A helical spring 18 is disposed between the cylindrical collar 7 and the tubular member 3 and bears on the cylindrical collar 7 and the upper surface of the internal collar 16. The spring 18 urges the internal collar 16 away from the tubular cylindrical collar 7. When no external force is applied, the internal collar 16 is urged to a position where the radial shoulder inside the collar contacts the cir-clip 21 surrounding the main probe body 1, preventing further movement of the internal collar with respect to the remainder of the structure.

In this position, the exposed face 22 of the main probe body 1 is positioned within the internal collar 16.

Figure 2:
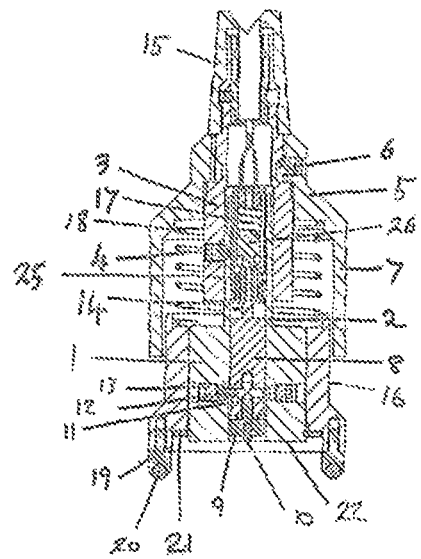
FIG. 2 is an axial cross-section of the probe of FIG. 1.
Figure 3:
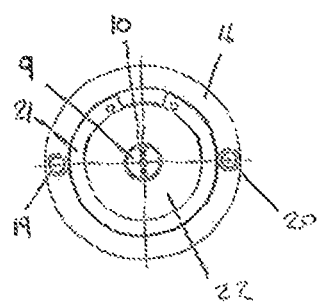
FIG. 3 is an underplan view of the probe of FIG. 1.

A dust seal 23 (not shown in FIG. 2) may be disposed between the internal 16 and outer 7 collars, and the main probe body 1 and the internal collar 16.

The probe is intended for making surface profile measurements of convex surface which is curved in one direction, such as the outside of a cylinder, for example a pipe.

In use the probe is electrically connected to a suitable electronic instrument. Then, holding the outer sleeve 7, or a connected part, the tips 20 of the two feet 19 are placed into contact with a surface to be measured. Ideally, the probe is placed so that a line extending through the tips of both feet runs substantially parallel to the direction in which the surface curves. Other positions are possible, provided that the surface does not extend in a straight line, i.e. with no curvature, between the points of contact of the two feet. Then the outer sleeve 7 is urged towards the surface to be measured, against the action of the helical spring 18. This causes the outer sleeve 7, tubular member 3, tube 2 and main probe body 1 to move relative to the internal collar 16 so that the face 22 of the main probe body comes into contact with the surface to be measured. The tip 10 and supporting rod 8 will move with the main probe body towards the surface until the tip contacts the surface. Further movement of the main probe body will then cause the tip to be displaced into the main probe body, compressing helical spring 17, until the main probe body also contacts the surface, whereupon the degree of displacement of the tip 10 into the main probe body can be determined by the electronic instrument.

The tips 20 of the two feet contact the surface at two spaced apart points. When the face of the main probe body contacts the surface it will contact the surface along a line. Contact at two points and along a line is sufficient to ensure that that main probe body, and tip, extend substantially perpendicularly to the surface at the point of contact of the tip, so that an accurate profile measurement can be made.

Figure 4:
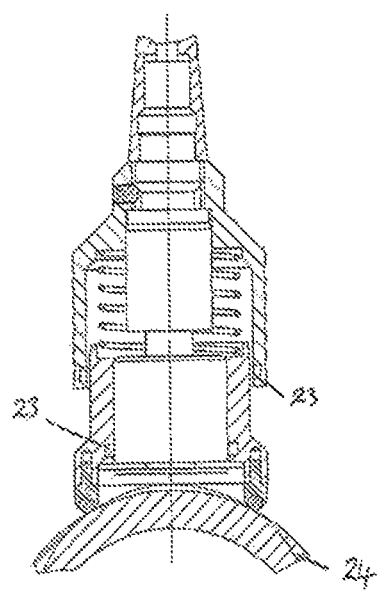
FIG. 4 is a view corresponding to FIG. 2, with some detail removed and showing the probe in use on two different diameters of pipe.

FIG. 4 shows the probe and two different diameters of pipe 24.

It will be appreciated that by providing a third foot and tip it would be possible to make a measurement on a surface which is curved in more than one direction, such as a spherical surface. In this example the points of the probe could be arranged at points of an equilateral triangle.

The probe could be connected to a suitable electronic instrument by a wired or wireless connection. The instrument may store and/or display measurements and it may compute statistical information from the measurements.

The above embodiment is described by way of example only. Many variations are possible without departing from the scope of the invention as defined in the appended claims.

The invention claimed is:

1. A surface roughness measurement probe comprising two spaced apart points for contacting a convex surface to be measured, at least a straight edge moveable relative to the two points to enable the straight edge to be brought into contact with a convex surface contacted by the two points and a tip protruding from and moveably mounted relative to the straight edge for measuring the surface roughness of a surface contacted by the straight edge.

2. A probe as claimed in claim 1 wherein the straight edge is comprised in a substantially flat surface.

3. A probe as claimed in claim 2 wherein the substantially flat surface is substantially annular in shape and the tip protrudes from substantially the centre of the annulus.

4. A probe as claimed in claim 1 wherein the straight edge lies in a plane which is substantially parallel to a straight line extending through the two points.

5. A probe as claimed in claim 1 wherein the straight edge extends in a direction substantially perpendicular to a straight line extending through the two points.

6. A probe as claimed in claim 1 wherein the straight edge is moveable relative to the two points in a direction substantially at right angles to a straight line extending through the two points.

7. A probe as claimed in claim 6 wherein the straight edge is constrained to move in that direction.

8. A probe as claimed in claim 1 wherein the straight edge is movable from a position so that it is displaced from a straight line extending through the two points to, at least, a position where it contacts that line.

9. A probe as claimed in claim 8 wherein the straight edge is resiliently biased to the displaced position relative to the points.

10. A probe as claimed in claim 1 wherein the points are formed by feet.

11. A probe as claimed in claim 1 wherein the two points are formed by ball bearings.

12. A probe as claimed in claim 1 wherein the straight edge is formed on a probe body, and the points are provided on a structure at opposite sides respectively of the body.

13. A probe as claimed in claim 12 wherein the structure on which the points are disposed is a collar surrounding the probe body.

14. A probe as claimed in claim 1 comprising a sensor arranged to measure displacement between the tip and the straight edge, when the straight edge and the tip are in contact with the surface to be measured.

15. A probe as claimed in claim 1, wherein the tip is sharp.

16. A probe as claimed in claim 15, wherein the tip has a point with an included angle of substantially 60 degrees.

17. A probe as claimed in claim 15, wherein the tip has a point with an included angle of substantially 30 degrees.

18. A method of measuring the surface roughness of a convex surface comprising the steps of providing a probe as claimed in claim 1, placing the points of the probe into contact with the surface to be measured, bringing the straight edge and the tip into contact with the surface to be measured and measuring the displacement between the straight edge and the tip while the straight edge and the tip are in contact with the surface to be measured.

19. A surface profile measurement probe comprising two spaced apart points for contacting a convex surface to be measured, at least a straight edge moveable relative to the two points to enable the straight edge to be brought into contact with a convex surface contacted by the two points and a tip protruding from and moveably mounted relative to the straight edge for measuring the profile of a surface contacted by the straight edge, wherein the straight edge is formed on a probe body, and the points are provided on a structure at opposite sides respectively of the body, and wherein the structure on which the points are disposed is a collar surrounding the probe body.

* * * * *